US007907773B2

(12) United States Patent
Bates et al.

(10) Patent No.: US 7,907,773 B2
(45) Date of Patent: Mar. 15, 2011

(54) APPARATUS AND METHOD FOR HOLOGRAPHIC INFORMATION STORAGE AND RETRIEVAL

(75) Inventors: Allen Keith Bates, Tucson, AZ (US); Nils Haustein, Soergenloch (DE); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1088 days.

(21) Appl. No.: 11/643,605

(22) Filed: Dec. 20, 2006

(65) Prior Publication Data
US 2008/0151338 A1 Jun. 26, 2008

(51) Int. Cl.
*G06K 9/00* (2006.01)
*G06K 9/36* (2006.01)
*G03H 1/10* (2006.01)

(52) U.S. Cl. .......... 382/154; 382/210; 382/232; 359/10; 359/21; 359/22

(58) Field of Classification Search .................. 382/100, 382/154, 210–211, 232–253; 359/10, 21
See application file for complete search history.

(56) References Cited

U.S. PATENT DOCUMENTS

| | | | | |
|---|---|---|---|---|
| 5,216,527 A | * | 6/1993 | Sharnoff et al. | 359/10 |
| 5,543,267 A | | 8/1996 | Stumpe et al. | |
| 5,846,452 A | | 12/1998 | Gibbons et al. | |
| 5,877,873 A | * | 3/1999 | Bashaw et al. | 359/10 |
| 6,414,763 B1 | * | 7/2002 | Hesselink et al. | 359/21 |
| 6,803,153 B1 | | 10/2004 | Kawano et al. | |
| 7,792,390 B2 | * | 9/2010 | Prakash et al. | 382/302 |
| 2005/0013231 A1 | | 1/2005 | Kawano et al. | |
| 2005/0152670 A1 | | 7/2005 | Skaar | |

FOREIGN PATENT DOCUMENTS

CN 1945605 A 4/2007

OTHER PUBLICATIONS

Chinese Office Action, mailed Aug. 28, 2009, 5 pages.
Okamota et al., "Fault tolerant function of dynamic refreshing holographic memory with shutter-less optical feedback circuit", Journal of Modern Optics, vol. 52, No. 17, Nov. 20, 2005, pp. 2453-2465, 2005 Taylor & Francis.

* cited by examiner

*Primary Examiner* — Manav Seth
(74) *Attorney, Agent, or Firm* — Dale F. Regelman; Quarles & Brady LLP

(57) ABSTRACT

A method is disclosed to store and retrieve information using holographic data storage media. The method provides original data, generates a first image of that original data, and encodes that first image in a holographic data storage medium at a first storage location. The method then generates a second image of the original data, where the second image differs from the first image, and encodes the second image in a holographic data storage medium at a second storage location, where the second storage location differs from the first storage location.

16 Claims, 13 Drawing Sheets

FIG. 7A

| 712 | 714 | 716 |
|---|---|---|
| 1 | 0 | 1 |
| 0 | 1 | 0 |
| 1 | 0 | 1 |

| 722 | 724 | 726 |
|---|---|---|
| 1 + n | 0 + n | 1 + n |
| 0 | 1 | 0 |
| 1 | 0 | 1 |

720

| 0 | 1 | 0 |
|---|---|---|
| 1 | 0 | 1 |
| 0 | 1 | 0 |

730

| 0 + n | 1 + n | 0 + n |
|-------|-------|-------|
| 1     | 0     | 1     |
| 0     | 1     | 0     |

740

APPARATUS AND METHOD FOR HOLOGRAPHIC INFORMATION STORAGE AND RETRIEVAL

FIELD OF THE INVENTION

This invention relates to an apparatus, and method using that apparatus, to store and retrieve information using one or more holographic data storage media.

BACKGROUND OF THE INVENTION

In holographic information storage, an entire page of information is stored at once as an optical interference pattern within a thick, photosensitive optical material. This is done by intersecting two coherent laser beams within the storage material. The first, called the data beam, contains the information to be stored; the second, called the reference beam, is designed to be simple to reproduce—for example, a simple collimated beam with a planar wavefront.

The resulting optical interference pattern, of the two coherent laser beams, causes chemical and/or physical changes in the photosensitive medium: a replica of the interference pattern is stored as a change in the absorption, refractive index, or thickness of the photosensitive medium. When the stored interference pattern is illuminated with one of the two waves that was used during recording, some of this incident light is diffracted by the stored interference pattern in such a fashion that the other wave is reconstructed. Illuminating the stored interference pattern with the reference wave reconstructs the data beam, and vice versa.

A large number of these interference patterns can be superimposed in the same thick piece of media and can be accessed independently, as long as they are distinguishable by the direction or the spacing of the patterns. Such separation can be accomplished by changing the angle between the object and reference wave or by changing the laser wavelength. Any particular data page can then be read out independently by illuminating the stored patterns with the reference wave that was used to store that page. Because of the thickness of the hologram, this reference wave is diffracted by the interference patterns in such a fashion that only the desired object beam is significantly reconstructed and imaged on an electronic camera. The theoretical limits for the storage density of this technique are on the order of tens of terabits per cubic centimeter.

SUMMARY OF THE INVENTION

What is needed is an apparatus, and a method using that apparatus, to encode information in a holographic data storage medium, decode information from that encoded holographic data storage medium, and optionally to correct that decoded information. Applicants' invention comprises a method to store and retrieve information using holographic data storage media. The method provides original data, generates a first image of that original data, and encodes that first image in a holographic data storage medium at a first storage location. The method then generates a second image of the original data, where the second image differs from the first image, and encodes the second image in a holographic data storage medium at a second storage location, wherein the second storage location differs from the first storage location.

BRIEF DESCRIPTION OF THE DRAWINGS

The invention will be better understood from a reading of the following detailed description taken in conjunction with the drawings in which like reference designators are used to designate like elements, and in which:

FIG. 7A illustrates a first image comprising original data as that first image is displayed on either a transmissive or a reflective spatial light modulator;

FIG. 7B illustrates a retrieved first image, where the original data of FIG. 7A is corrupted with noise artifacts;

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
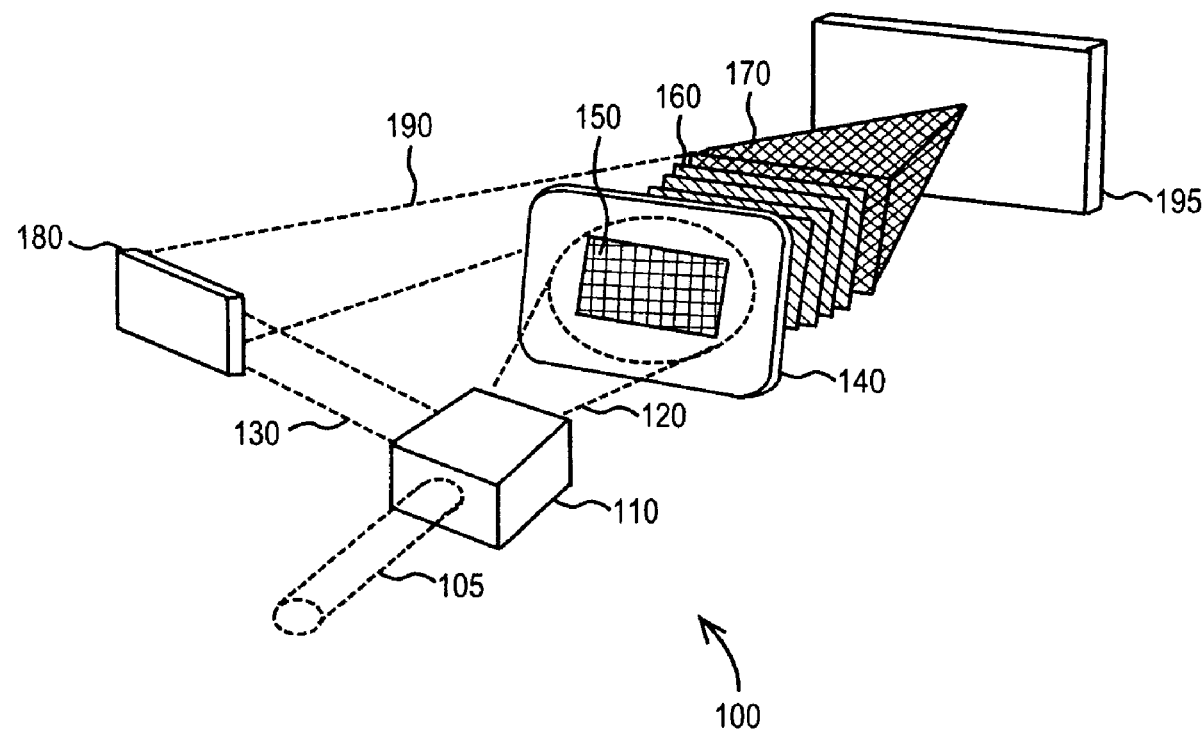
FIG. 1 is a view of a one embodiment of a holographic information recording apparatus.

FIG. 1 illustrates a holographic information recording apparatus 100. Apparatus 100 comprises a laser light source 105, a laser beam splitter 110, data carrier beam 120, and reference beam 130. In the illustrated embodiment of FIG. 1, apparatus 100 further comprises a Spatial Light Modulator ("SLM") 140, a data beam 160, a mirror 180, and a holographic data storage medium 195.

Generally, the SLM 140 is an LCD-type device. Information is represented by either a light or a dark pixel on the SLM 140 display. The SLM 140 is typically translucent. Laser light originating from the laser source 105 is split by the beam splitter 110 into two beams, a carrier beam 120 and a reference beam 130. The carrier beam 120 picks up the image 150 displayed by the SLM 140 as the light passes through the SLM 140.

Reference beam 130 is reflected by the mirror 180 to produce reflected reference beam 190. Reflected reference beam 190 interferes with the data beam 160 to form hologram 170. The resulting 170 is stored on a holographic storage medium 195. Mirror 180 is typically a first-surface mirror.

Figure 2:
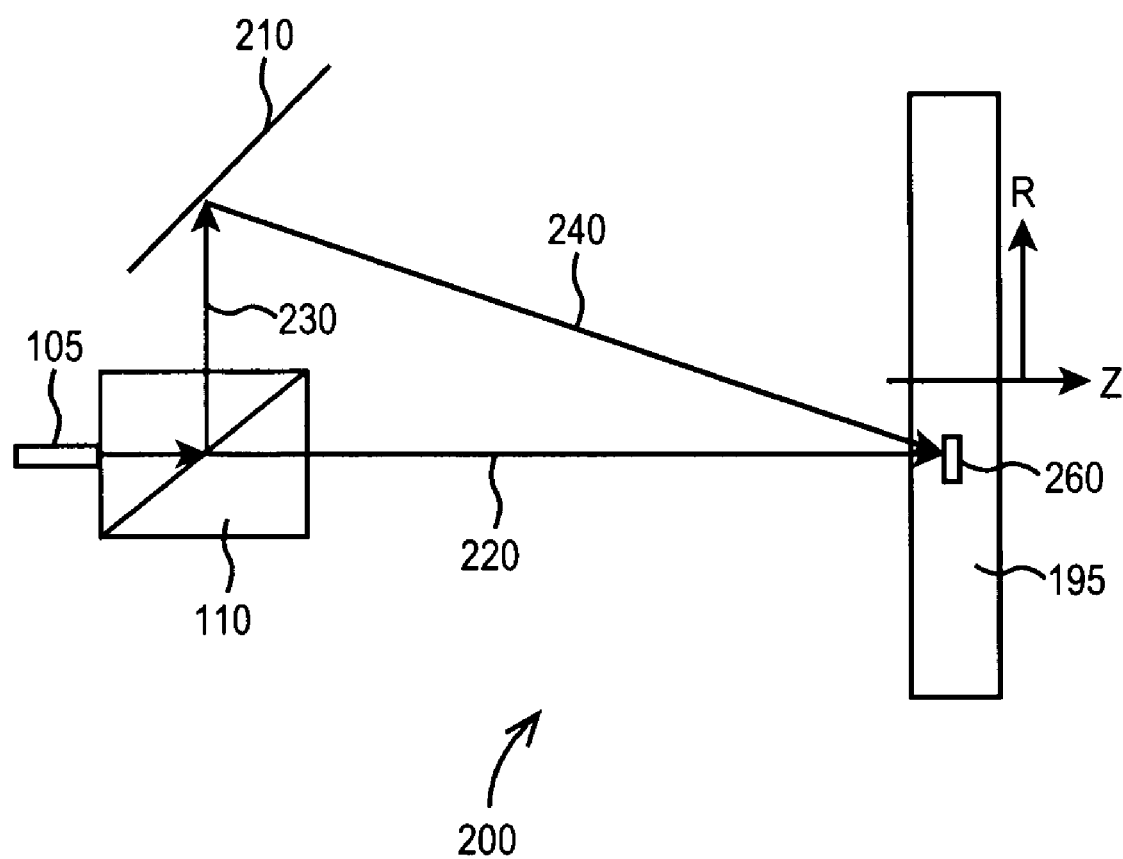
FIG. 2 is a block diagram showing a second embodiment of a holographic information recording apparatus.
Figure 3:
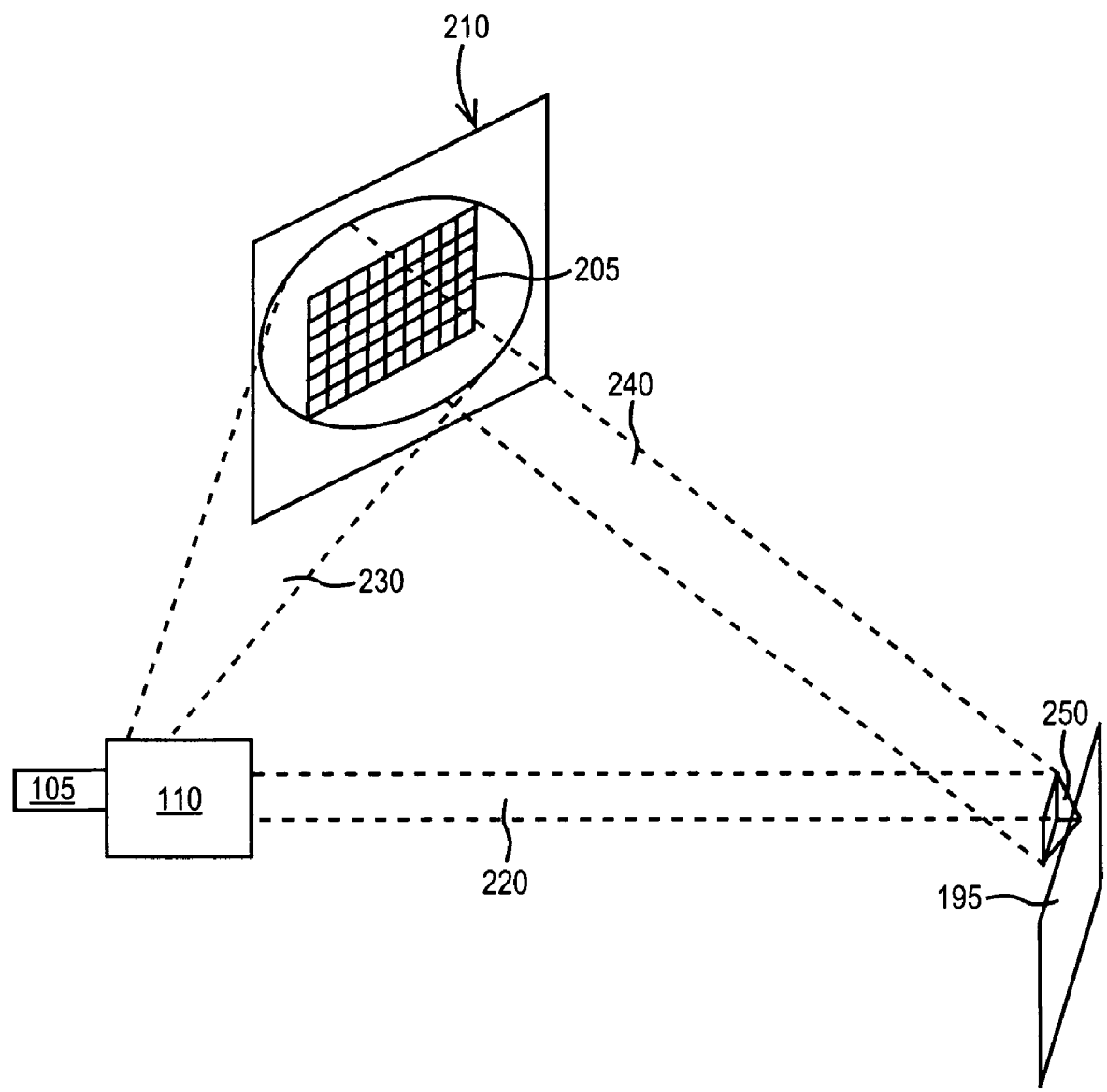
FIG. 3 is a perspective view of the holographic information recording apparatus of FIG. 2.

Referring now to FIGS. 2 and 3, holographic information recording apparatus 200 is described and claimed in a pending Application having Ser. No. 11/412,658 which is assigned to the common assignee hereof, and which is hereby incorporated by reference herein. Apparatus 200 comprises laser light source 105, splitter 110, reflective spatial light modulator 210, and holographic storage medium 195. The light generated by source 105 is split by splitter 110 into reference beam 220, and data carrier beam 230. Using Apparatus 200, reference beam 220 is not reflected.

In the illustrated embodiment of FIG. 3, reflective spatial light modulator ("RSLM") 210 comprises data image 205. In certain embodiments, reflective spatial light modulator 210 comprises an assembly comprising a plurality of micro mirrors. In other embodiments, reflective spatial light modulator 210 comprises a liquid crystal on silicon ("LCOS") display device. In contrast to nematic twisted liquid crystals used in LCDs, in which the crystals and electrodes are sandwiched between polarized glass plates, LCOS devices have the liquid crystals coated over the surface of a silicon chip. The electronic circuits that drive the formation of the image are etched into the chip, which is coated with a reflective (aluminized) surface. The polarizers are located in the light path both before and after the light bounces off the chip. LCOS devices are easier to manufacture than conventional LCD displays. LCOS devices have higher resolution because several million pixels can be etched onto one chip. LCOS devices can be much smaller than conventional LCD displays.

Carrier beam 230 picks up image 205 as the light is reflected off reflective spatial light modulator 210 to form reflected data beam 240 comprising image 205. Unreflected reference beam 220 interferes with reflected data beam 240 to form hologram 250. Hologram 250 is formed within storage medium 195 thereby causing the photo-active storage medium to create interference pattern 260 comprising an encoded hologram 250.

Figure 4:
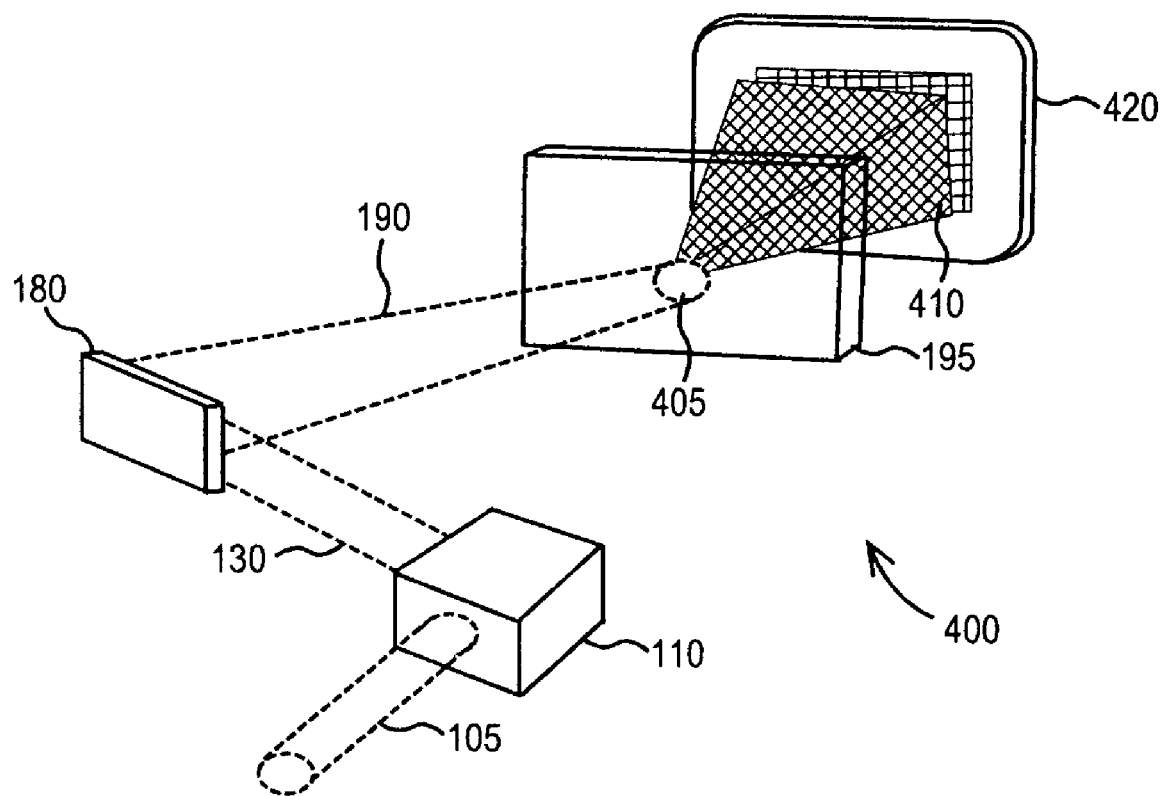
FIG. 4 is a perspective view of a first embodiment of a holographic information reading apparatus.

FIG. 4 illustrates holographic information reading apparatus 400. Apparatus 400 comprises laser light source 105, beam splitter 110, holographic storage medium 195, and optical sensor 420. Optical sensor 420 is disposed a distance away from the holographic storage medium 195 sufficient to accurately capture the image 410 projected. To read the hologram, reference beam 130 is reflected off of mirror 180, to become reflected reference beam 190, which is then incident on the holographic storage medium 195. As the reference beam 190 interferes with the encoded hologram 405 stored on the storage medium 195, an image 410 resembling the original image 150 (FIG. 1) displayed by the SLM 140 (FIG. 1) is projected against the optical sensor 420. The optical sensor 420 then captures the information comprising image 410.

Figure 5:
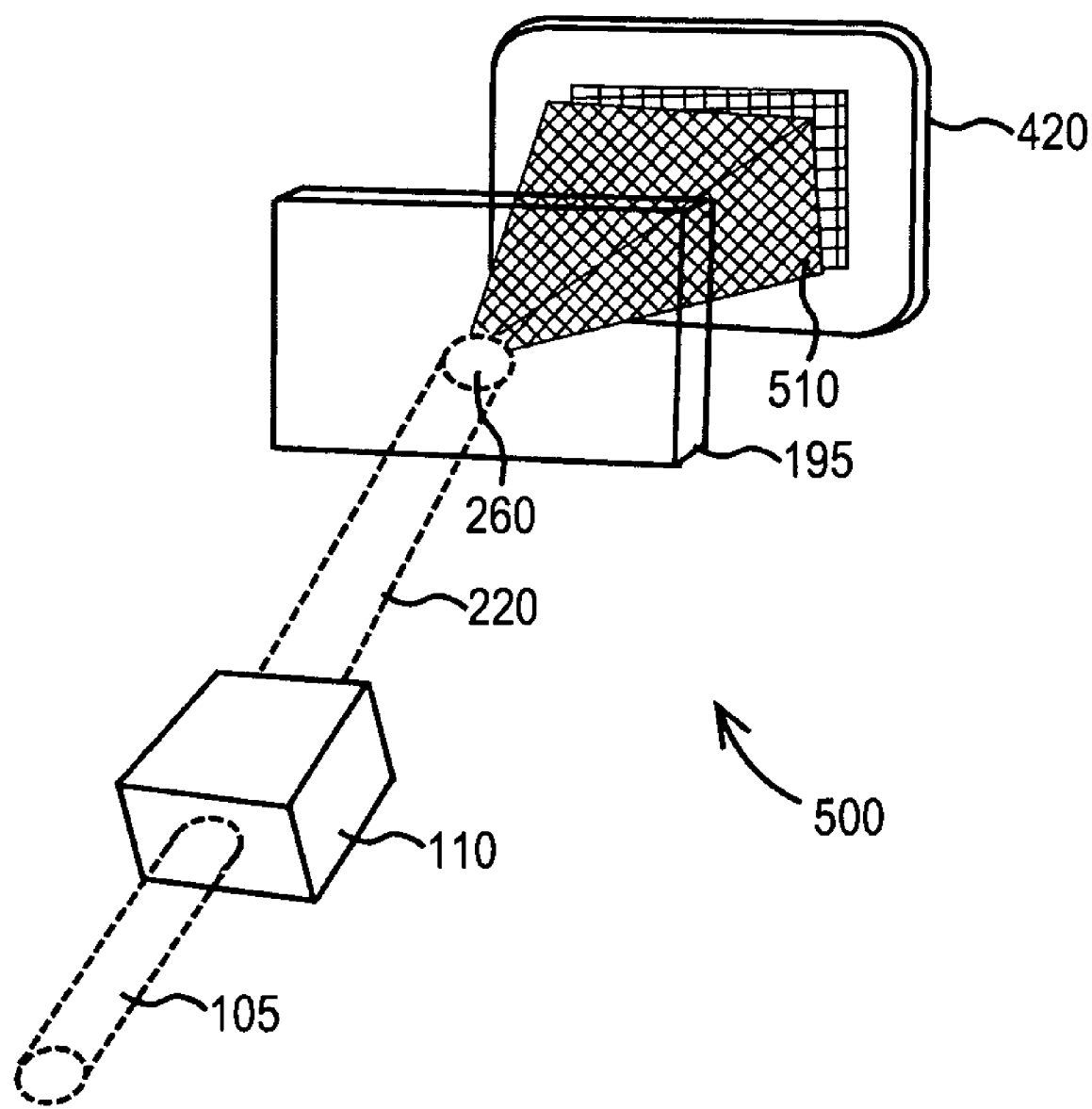
FIG. 5 is a perspective view of a second embodiment of a holographic information reading apparatus.

FIG. 5 shows holographic information reading apparatus 500. Apparatus 500 is described and claimed in the above-described pending application having Ser. No. 11/412,658. Apparatus 500 comprises laser light source 105, optional beam splitter 110, and optical sensor 420. Light source 105 and splitter 110 provide reference beam 220.

The unreflected reference beam 220 is directed to holographic storage medium 195 such that reference beam 220 is diffracted by the interference pattern 260 (FIG. 2) to form image 510 resembling the original image 205 (FIG. 3) displayed on Applicants' reflective spatial light modulator 210. Image 510 is projected against the optical sensor 420. The optical sensor 420 then captures the information comprising image 510.

In the illustrated embodiment of FIG. 5, holographic information reading apparatus 500 comprises beam splitter 110. In other embodiments, holographic information reading apparatus 500 does not comprise a beam splitter. In these embodiments, laser light source 105 provides reference beam 220, which is directed without reflection to holographic storage medium 195 such that reference beam 220 is diffracted by the interference pattern 260 (FIG. 2) to form image 510 resembling the original image 205 (FIG. 3) displayed on Applicants' reflective spatial light modulator 210. Image 510 is projected against the optical sensor 420. The optical sensor 420 then captures the information comprising image 510.

Figure 6:
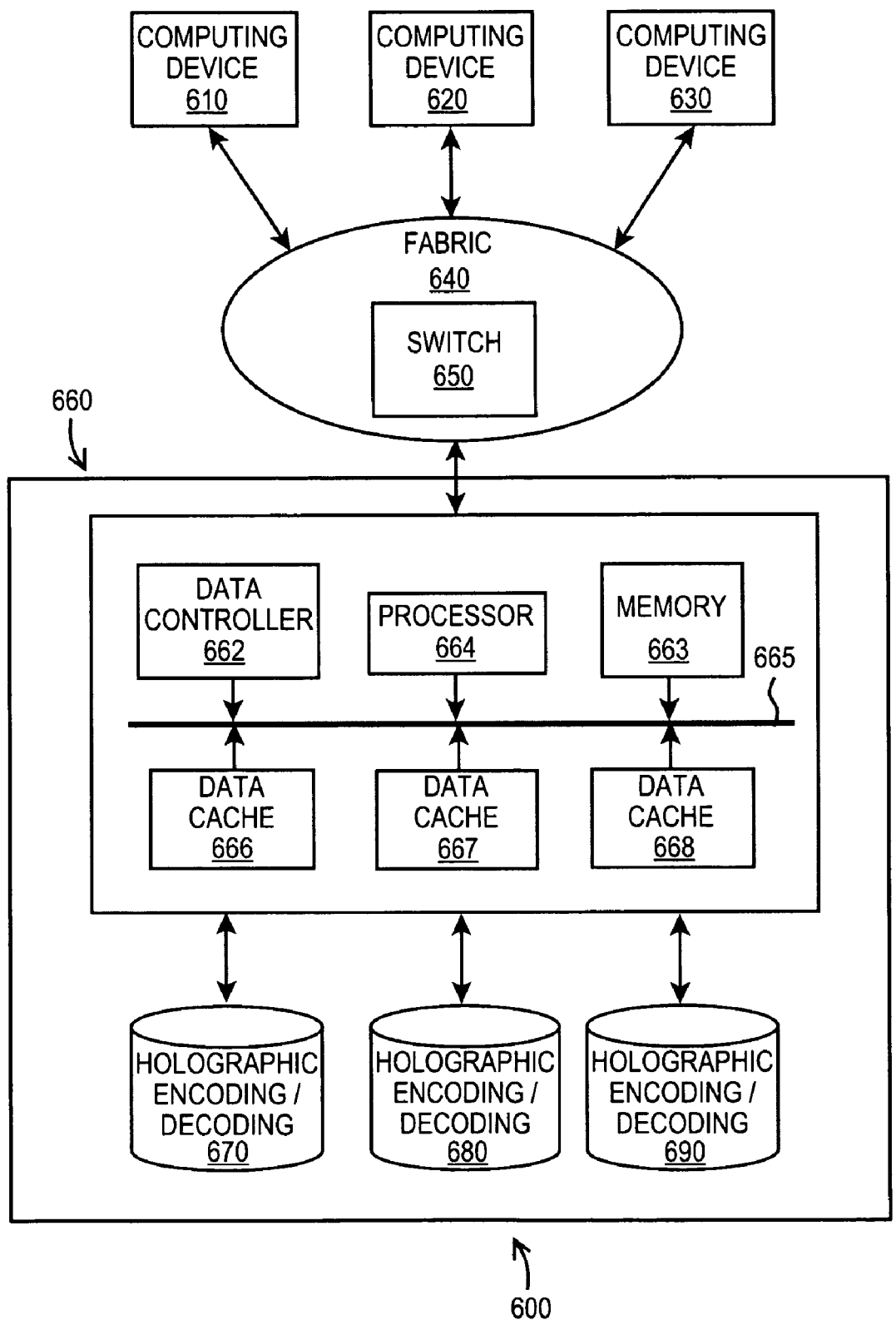
FIG. 6 is a block diagram showing Applicants' data storage system.

FIG. 6 illustrates one embodiment of Applicants' holographic data storage and retrieval system 600. In the illustrated embodiment of FIG. 6, holographic data storage and retrieval system 600 communicates with computing devices 610, 620, and 630. In the illustrated embodiment of FIG. 6, computing devices 610, 620, and 630 communicate with storage controller 660 through a data communication fabric 640. In certain embodiments, fabric 640 comprises one or more data switches 650. Further in the illustrated embodiment of FIG. 6, storage controller 660 communicates with one or more holographic encoding/decoding systems. In the illustrated embodiment of FIG. 6, holographic data storage and retrieval system 600 comprises holographic encoding/decoding systems 670, 680, and 690, wherein each of those holographic encoding/decoding systems comprises a holographic information encoding apparatus, such as and without limitation apparatus 100 or apparatus 400, in combination with a holographic information decoding apparatus, such as and without limitation apparatus 200 or apparatus 500.

In certain embodiments, computing devices 610, 620, and 630, are selected from the group consisting of an application server, a web server, a work station, a host computer, or other like device from which information is likely to originate. In certain embodiments, one or more of computing devices 610, 620, and/or 630 are interconnected with fabric 640 using Small Computer Systems Interface ("SCSI") protocol running over a Fibre Channel ("FC") physical layer. In other embodiments, the connections between computing devices 610, 620, and 630, comprise other protocols, such as Infiniband, Ethernet, or Internet SCSI ("iSCSI"). In certain embodiments, switches 650 are configured to route traffic from the computing devices 610, 620, and/or 630, directly to the storage controller 660.

In the illustrated embodiment of FIG. 6, storage controller 660 comprises a data controller 662, memory 663, processor 664, and data caches 666, 667, and 668, wherein these components communicate through a data bus 665. In certain embodiments, memory 663 comprises a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like In certain embodiments, the storage controller 660 is configured to read data signals from and write data signals to a serial data bus on one or more of the computing devices 610, 620, and/or 630. Alternatively, in other embodiments the storage controller 660 is configured to read data signals from and write data signals to one or more of the computing devices 610, 620, and/or 630, through the data bus 665 and the fabric 640.

In certain embodiments, storage controller 660 converts a serial data stream into a convolution encoded data images. Those data images are transferred to an SLM 140 (FIG. 1) or a RSLM 210 (FIGS. 2, 3) disposed in one or more of holographic encoding/decoding systems 670, 680, and/or 690.

In certain embodiments, holographic encoding/decoding systems 670, 680, and 690, are located in different geographical places. In certain embodiments, storage controller 660 distributes information between two or more holographic encoding/decoding systems in order to protect the information.

Applicants' invention comprises a method to correct data read from a holographic data storage medium, such as holographic data storage medium 195 (FIGS. 1, 2, 3, 4, 5). A data storage services provider may use the steps of Applicants' method to provide data storage services to one or more data storage services customers.

Figure 14A:
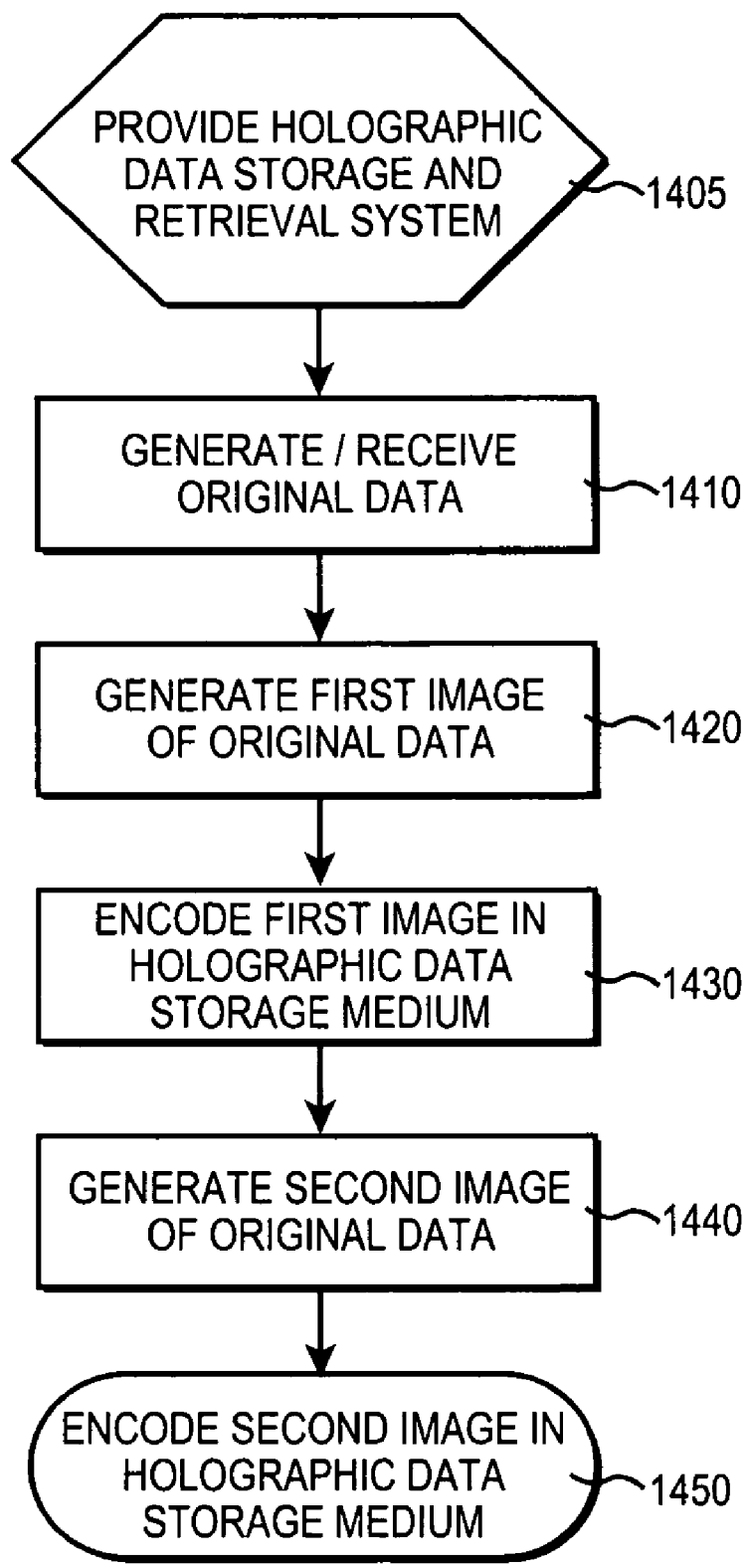
FIG. 14A is a flow chart summarizing the steps of Applicants' method to encode data in a holographic data storage medium.
Figure 14B:
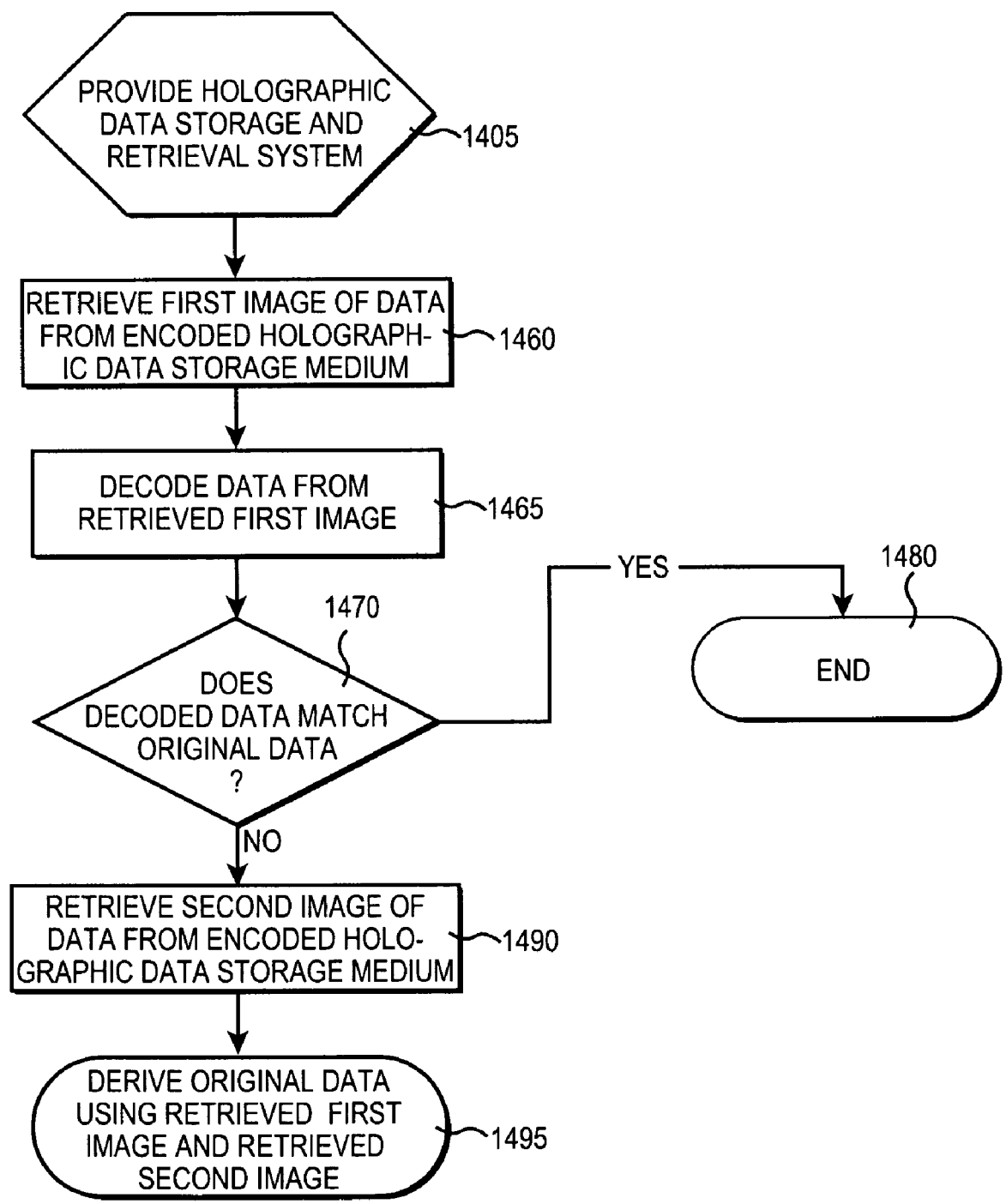
FIG. 14B is a flow chart summarizing the steps of Applicants' method to decode data previously encoded in a holographic data storage medium, and to optionally correct that decoded data.

FIG. 14A summarizes the steps of Applicants' method to encode two different images of original data in one or more holographic data. FIG. 14B summarizes the steps of Applicants' method to read that encoded data by retrieving the first image, and if necessary retrieving the second image. Referring now to FIG. 14A, in step 1405 Applicants' method provides a holographic data storage and retrieval system.

In certain embodiments, step 1405 comprises supplying s holographic data storage and retrieval system 600 (FIG. 6). In certain embodiments, step 1405 comprises supplying s holographic data storage and retrieval system 600 (FIG. 6) in communication with a plurality of computing devices, such as and without limitation computing devices 610, 620, and 630. In certain of these embodiments, one or more of computing devices 610, 620, and/or 630, are owned and/or operated by one or more data storage services customers, wherein holographic data storage and retrieval system 660 is owned and/or operated by a data storage services provider.

In step 1410, Applicants' method generates original data. In certain embodiments, the data of step 1410 is generated by one or more computing devices, such as computing devices 610, 620, and/or 630. In certain embodiments, the data of step 1410 is received by a storage controller, such as storage controller 660.

In step 1420, Applicants' method generates a first image of the data of step 1410. In certain embodiments, a storage controller, such as storage controller 660 (FIG. 6), generates the first image, and then provides that first image to one or more encoding/decoding system, such as holographic encoding/decoding systems 670, 680, and/or 690.

In certain embodiments, Applicants' method in step 1420 performs a cyclic redundancy check ("CRC") on the original data and generates original data CRC information. In certain embodiments, Applicants' method in step 1420 performs a longitudinal redundancy check ("LRC") on the original data and generates original data LRC information. In certain embodiments, in step 1420 Applicants' method encodes in the holographic data storage medium the original data CRC information and/or the original data LRC information.

In step 1430, Applicants' method encodes the first image of step 1420 in a first holographic data storage medium disposed in one or more of holographic encoding/decoding systems 670, 680, and/or 690 provided in step 1405. Step 1430 further comprises displaying the first image of step 1420 on a spatial light modulator, such as and without limitation SLM 140 (FIG. 1) or RSLM 210 (FIGS. 2, 3), disposed in one or more of holographic encoding/decoding systems 670, 680, and/or 690. In certain embodiments, step 1430 is performed by one or more of holographic encoding/decoding systems 670, 680, and/or 690.

In certain embodiments, step 1430 further comprises encoding the first image at a first storage location in the first holographic data storage medium. In certain embodiments, step 1430 is performed by a storage controller, such as storage controller 660 (FIG. 6). In certain embodiments, step 1430 is performed by a processor, such as processor 664 (FIG. 6), disposed in a storage controller, such as storage controller 660 (FIG. 6). In certain embodiments, step 1430 is performed by one or more of the holographic encoding/decoding systems 670, 680, and/or 690.

Figures 7A, 7B:
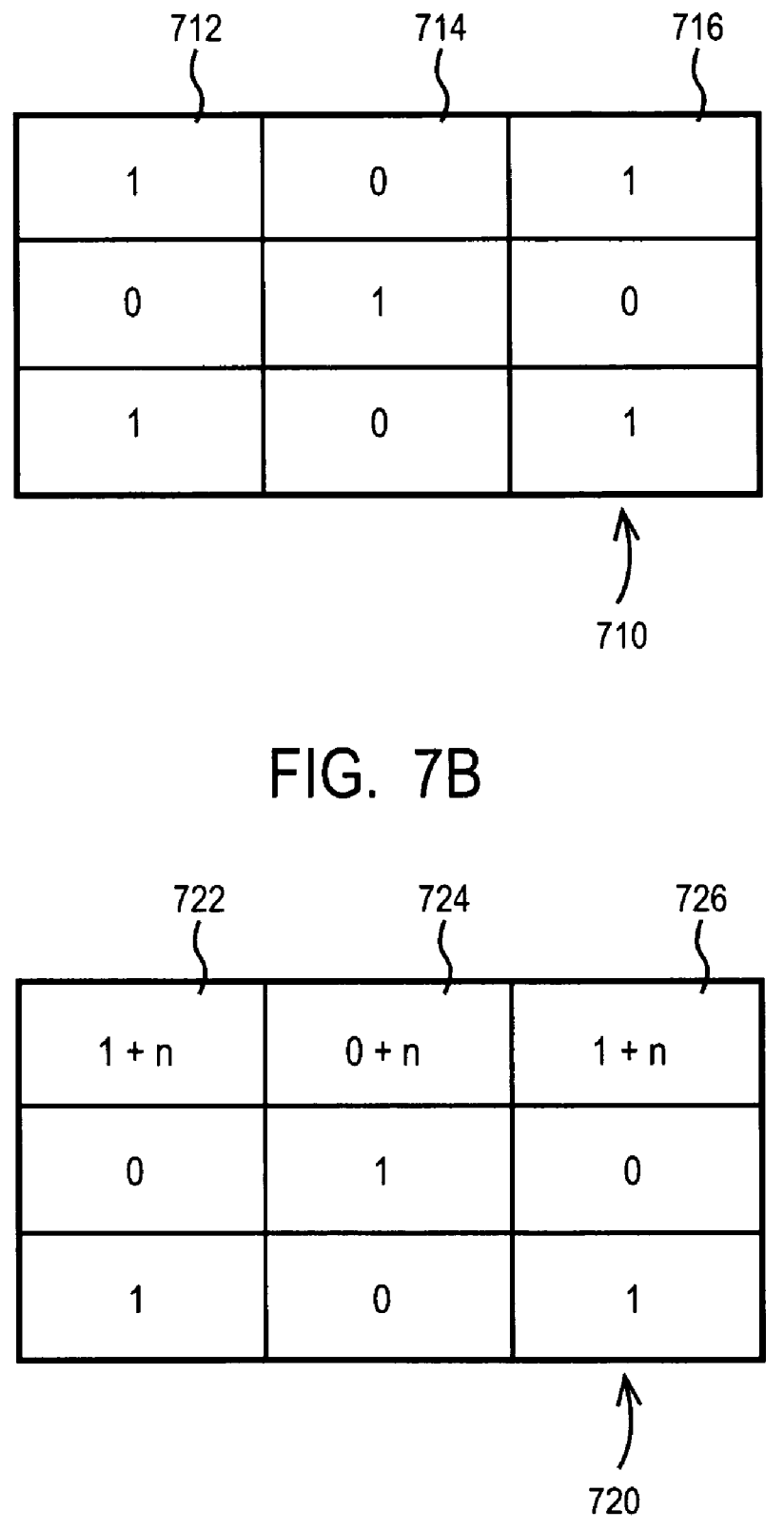

For example and referring now to FIGS. 7A and 14, image 710 comprises a first image comprising the original data of step 1410, where that first image is displayed on SLM 140 (FIG. 1) and/or RSLM 210 (FIGS. 2, 3). Thereafter, in step 1430 the first image 710 of step 1420 is encoded in a holographic data storage medium, such as holographic data storage medium 195 (FIGS. 1, 2, 3, 4, 5).

Referring once again to FIG. 14A, in step 1440 Applicants' method generates a second image of the data of step 1410, wherein the first image of step 1420 differs from the second image of step 1440. In certain embodiments, a storage controller, such as storage controller 660 (FIG. 6), generates the second image of step 1440, and then provides that second image to one or more encoding/decoding system, such as holographic encoding/decoding systems 670, 680, and/or 690. In certain embodiments, step 1440 is performed by a processor, such as processor 664 (FIG. 6), disposed in a storage controller, such as storage controller 660 (FIG. 6).

Figure 7C:
FIG. 7C illustrates a second image comprising an inverse image of the original data of FIG. 7A, as that second image is displayed on either a transmissive or a reflective spatial light modulator.
Figure 7D:
FIG. 7D illustrates a retrieved second image, where the inverse data of FIG. 7C is corrupted with noise artifacts.

Referring now to FIGS. 7A, 7C and 14, in certain embodiments in step 1440 Applicants' method generates second image 730 comprising an inverse image of the first image 710. In certain embodiments, Applicants' method forms an inverse image of the first image by changing each "1" to a "0", and by changing each "0" to a "1."

In certain embodiments, the data of step 1410 comprises analog data, and in these embodiments Applicants' method forms an inverse image of the first image by changing each white area to a black area, and changing each black area to a white area. In certain embodiments, the formation of the second and inverse image of analog data is performed algorithmically.

As those skilled in the art will appreciate, a function of two orthogonal spatial coordinates can be expressed by means of a two-dimensional Fourier transform, as a function of two orthogonal spatial frequencies. In certain embodiments, Applicants' method applies such a two-dimensional Fourier transform model holography.

The two-dimensional Fourier transform of g(x,y) is defined as equation.(1), wherein ξ and η are spatial frequencies.

$$F\{g(x,y)\}=\iint g(x,y)\exp[-i2p(\xi x+\eta y)]dxdy=G(\xi,\eta) \quad (1)$$

Using equation.(1) to model a holographic system with noise in the optical path gives equation.(2).

$$F\{g(x,y)+n(x,y)\}=\iint[g(x,y)+n(x,y)]\exp[-i2p(\iota x+\eta y)]dxdy \quad (2)$$

Reversing the data in the spatial light modulator, such as SLM 140, so that the light areas become dark and the dark areas become light, gives equation (3).

$$F\{-g(x,y)+n(x,y)\}=\iint[-g(x,y)+n(x,y)]\exp[-i2p(\xi x+\eta y)]dxdy \quad (3)$$

The data stored in equation.(3) comprises the "negative image," and the data stored in equation.(2) comprises a "positive image."

Equations 2 and 3 can be added to give equation 4 to isolate during the data recovery process the effect of noise in the optical path during the write process, thereby combining the images from the data written as a "positive image" and data written as a "negative image". This noise may include optical aberrations from the optical components (i.e. beam splitter, spatial light modulator, and focus lenses) used in the read and/or write optical paths.

$$F\{n(x,y)\}=\iint n(x,y)\exp[-i2p(\xi x+\eta y)]dxdy \quad (4)$$

Once the noise n(x,y) is isolated, the desired data, equation. (1), can be more readily read from the optical media.

In certain embodiments, Applicants' method in step 1440 forms a second image from the first image by rotating the first image by +/−90 if the spatial light modulator is square, or 180 degrees if the spatial light modulator is rectangular or square.

Figure 9:
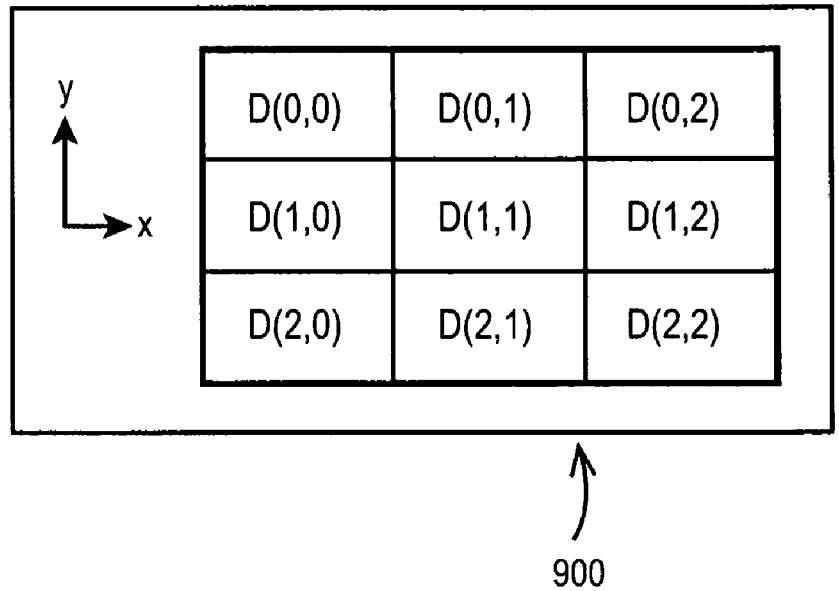
FIG. 9 illustrates a first image comprising original data as that first image is displayed on either a transmissive or a reflective spatial light modulator
Figure 10:
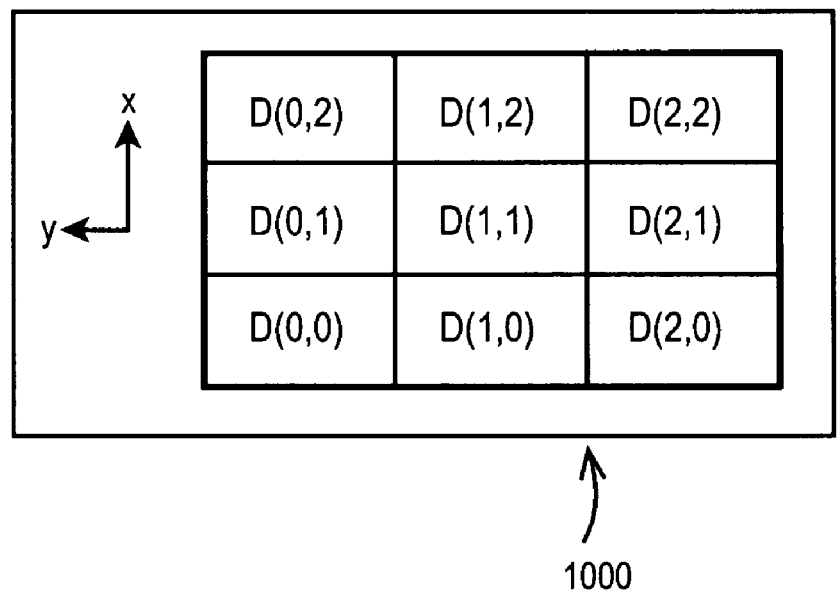
FIG. 10 illustrates a second image formed by rotating the data comprising the first image of FIG. 9 is a first direction by 90 degrees.
Figure 11:
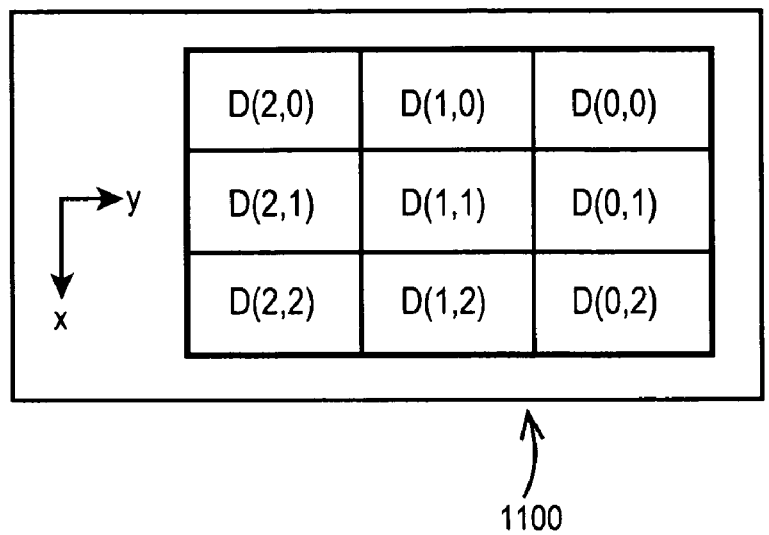
FIG. 11 illustrates a second image formed by rotating the data comprising the first image of FIG. 9 is a second direction by 90 degrees.
Figure 12:
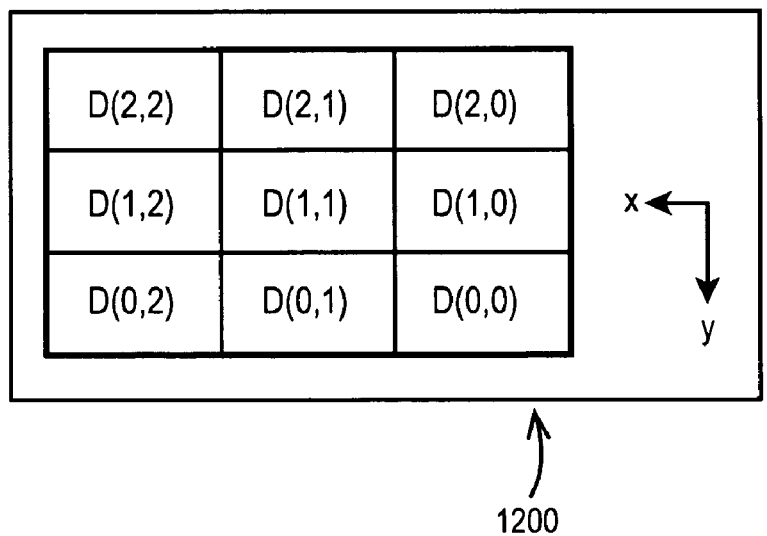
FIG. 12 illustrates a second image formed by rotating the data comprising the first image of FIG. 9 by 180 degrees.

For example and referring to FIGS. 9, 10, 11, and 12. FIG. 9 illustrates a first image 900 as displayed on an SLM, such as SLM 140 (FIG. 1), or on a RSLM, such as RSLM 210 (FIGS. 2, 3), wherein that first image comprises original data. FIG. 10 illustrates a second image 1000 as displayed on an SLM, such as SLM 140 (FIG. 1), or on a RSLM, such as RSLM 210 (FIGS. 2, 3), wherein that second image is formed by rotating first image 900 by 90 degrees in a first direction. FIG. 11 illustrates a second image 1100 as displayed on an SLM, such as SLM 140 (FIG. 1), or on a RSLM, such as RSLM 210 (FIGS. 2, 3), wherein that second image is formed by rotating first image 900 by 90 degrees in a second direction. FIG. 12 illustrates a second image 1200 as displayed on an SLM, such as SLM 140 (FIG. 1), or on a RSLM, such as RSLM 210 (FIGS. 2, 3), wherein that second image is formed by rotating first image 900 by 180 degrees.

Applicants have found that rotating a first image to form a second image is useful in overcoming astigmatism in the holographic media or in the recording optical path. Astigmatism arises where an optical component is more-oval shaped rather than spherical-shaped. In more exact terms, in optics, astigmatism arises when an optical system has different foci for rays that propagate in two perpendicular planes. To illustrate, if an optical system with astigmatism is used to form an image of a cross, the vertical and horizontal lines will be in sharp focus at two different distances. Rotating original data 900 (FIG. 9) by 90 degrees in either direction to form a second data image addresses this problem.

There are two distinct forms of astigmatism. The first is a third-order aberration, which occurs for objects (or parts of objects) away from the optical axis. This form of aberration occurs even when the optical system is perfectly symmetrical. This is often referred to as a "monochromatic aberration", because it occurs even for light of a single wavelength. This terminology may be misleading, however, as the amount of aberration can vary strongly with wavelength in an optical system.

The second form of astigmatism occurs when the optical system is not symmetric about the optical axis, which is entirely possible due to manufacturing tolerances of the holographic equipment. This may be by design (as in the case of a cylindrical lens), or due to manufacturing error in the surfaces of the components or misalignment of the components. In this case, astigmatism is observed even for rays from on-axis object points.

Figure 13:
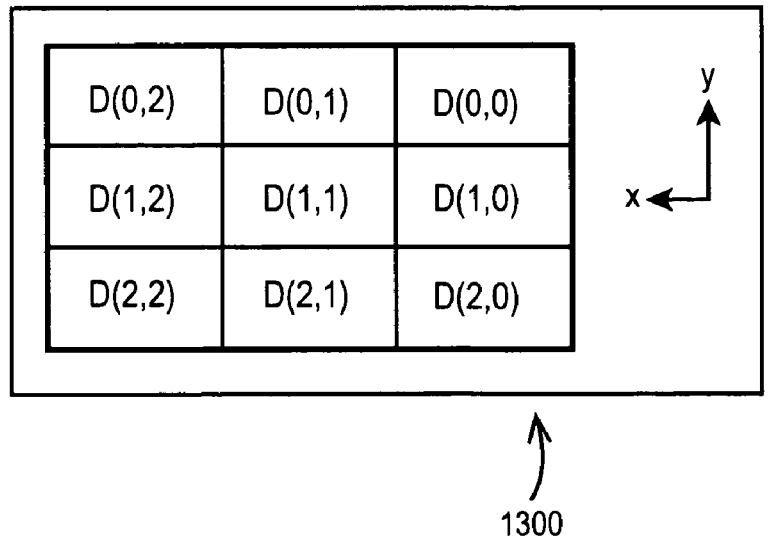
FIG. 13 illustrates a second image comprising the complex conjugate of the data comprising the first image of FIG. 9.

Referring now to FIGS. 9, 13, and 14, in certain embodiments in step 1440 Applicants' method forms a second image 1300 wherein the data comprising that second image 1300 comprise the complex-conjugate of the original data recited in first image 900 (FIG. 9). Second image 1300 is formed by displaying the original data shown in first image 900 in a right-to-left mode, rather than the typical left-to-right mode.

Referring once again to FIG. 14, Applicants' method transitions from step 1440 to step 1450 wherein Applicants' method encodes the second image of step 1424 in a holographic data storage medium disposed in one or more of holographic encoding/decoding systems 670, 680, and/or 690 provided in step 1405. Step 1450 further comprises displaying the second image of step 1440 on a spatial light modulator, such as and without limitation SLM 140 (FIG. 1) or RSLM 210 (FIGS. 2, 3), disposed in one or more of holographic encoding/decoding systems 670, 680, and/or 690. In certain embodiments, step 1450 is performed by one or more of holographic encoding/decoding systems 670, 680, and/or 690.

In certain embodiments, in step 1450 comprises encoding the second image of step 1440 at a second storage location in the first holographic data storage medium, wherein the first storage location differs from the second storage location. In other embodiments, in step 1450 Applicants' method encodes the second image of step 1440 to a second holographic data storage medium as a form of RAID-1 holographic data storage. In either case, the data of step 1410 is stored as both a first image and a second image formed by manipulating the first image to aid in the recovery of the data during a read process. As those skilled in the art will appreciate, Applicants' image reversal storage method is unique to holographically encoded media, wherein data is stored as interference patterns rather than '1's and '0's.

FIG. 14B summarizes the steps of Applicants' method to read data encoded in one or more holographic data storage media. In certain embodiments, the method of FIG. 14A transitions to step 1460 (FIG. 14B) if the write process includes an immediate read-back feature. In other embodiments, the steps of FIG. 14B are later used to read the data encoded using the steps of FIG. 14A.

Referring now to FIG. 14B, in step 1405 Applicants' method provides a holographic data storage and retrieval system. In certain embodiments, step 1405 comprises supplying s holographic data storage and retrieval system 600 (FIG. 6).

In step 1460, Applicants' method generates during a read process a retrieved first image by illuminating the encoded holographic data storage medium at the first storage location with a reference beam. In certain embodiments, step 1460 is performed by one or more of holographic encoding/decoding systems 670, 680, and/or 690. In certain embodiments, step 1460 is performed by a storage controller, such as storage controller 660 (FIG. 6). In certain embodiments, step 1460 is performed by a processor, such as processor 664 (FIG. 6), disposed in a storage controller, such as storage controller 660 (FIG. 6).

In step 1465, Applicants' method decodes data from that retrieved first image in step 1460. In certain embodiments, step 1465 is performed by one or more of holographic encoding/decoding systems 670, 680, and/or 690. In certain embodiments, step 1465 is performed by a storage controller, such as storage controller 660 (FIG. 6). In certain embodiments, step 1465 is performed by a processor, such as processor 664 (FIG. 6), disposed in a storage controller, such as storage controller 660 (FIG. 6).

Applicants' method transitions from step 1465 to step 1470 wherein the method determines if the data generated in step 1465 match the original data of step 1410. In certain embodiments, step 1470 is performed by a storage controller, such as storage controller 660 (FIG. 6). In certain embodiments, step 1470 is performed by a processor, such as processor 664 (FIG. 6), disposed in a storage controller, such as storage controller 660 (FIG. 6).

Applicants have found that data is sometimes corrupted with noise artifacts during the process of encoding the data to the holographic data storage medium and/or during the process of decoding the data from the encoded holographic data storage medium. For example and referring to FIGS. 7A and 7B, retrieved first image 720 differs from the original first image 710 comprising the original data of step 1410. More specifically, data point 722 comprises original data point 712 in combination with one or more noise artifacts n. Similarly, data points 724 and 726 comprise original data points 714 and 716, respectively, in combination with one or more noise artifacts n.

In certain embodiments, in step 1470 Applicants' method retrieves stored original data CRC information and/or original data LRC information. In these embodiments, Applicants' method in step 1470 performs a cyclic redundancy check ("CRC") on the data retrieved in step 1460, and generates retrieved data CRC information. In certain embodiments, Applicants' method performs a longitudinal redundancy check ("LRC") on the retrieved data and generates retrieved data LRC information. In the event the original data CRC and/or original data LRC information differs from the retrieved data CRC and/or retrieved data LRC information, respectively, then Applicants' method in step 1470 determines that the retrieved data comprises one or more noise artifacts introduced during the encoding and/or decoding process.

If Applicants' method determines in step 1470 that the retrieved data does not differ from the original data, then the method transitions from step 1470 to step 1480 and ends. If Applicants' method determines in step 1470 that the retrieved data differs from the original data, then the method transitions from step 1470 to step 1490 wherein the method retrieves the second image generated in step 1440 and encoded in step 1450 by illuminating the encoded holographic data storage medium at the second storage location with a reference beam. In certain embodiments, step 1490 is performed by a storage controller, such as storage controller 660 (FIG. 6). In certain embodiments, step 1490 is performed by a processor, such as processor 664 (FIG. 6), disposed in a storage controller, such as storage controller 660 (FIG. 6).

Applicants' method transitions from step 1490 to step 1495 wherein the method derives the original data of step 1410 using the retrieved first image of step 1460 and the retrieved second image of step 1490.

Figure 8:
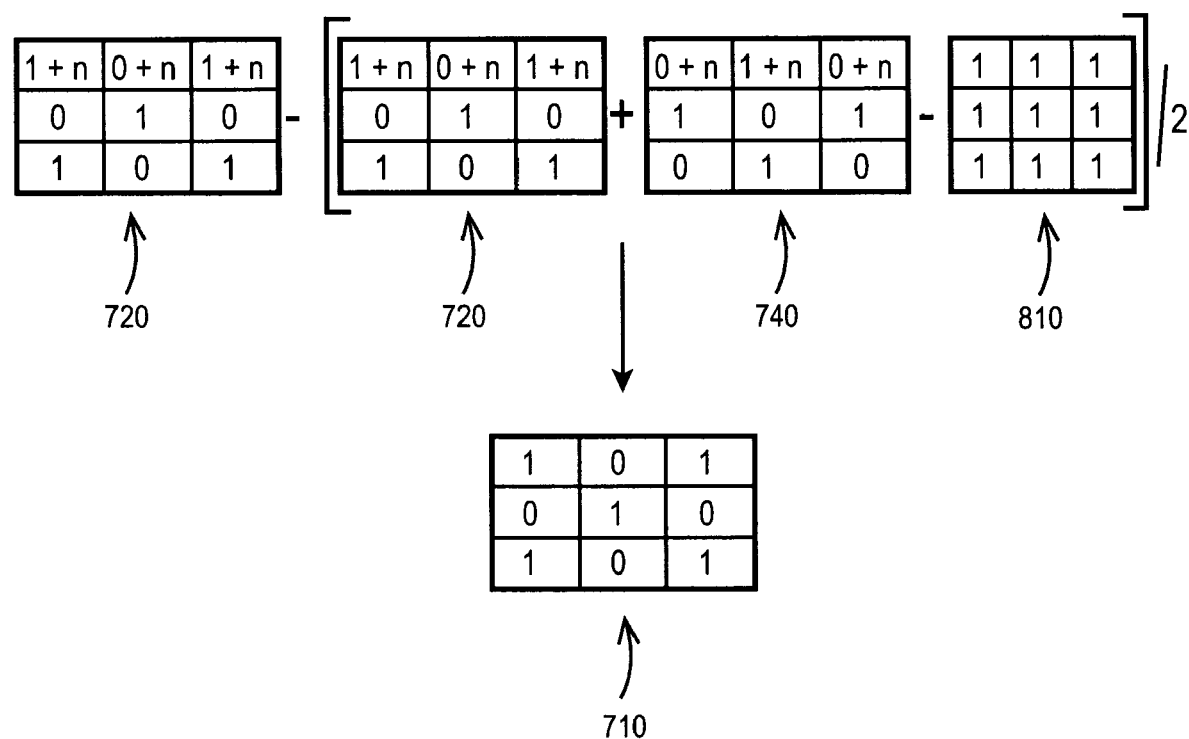
FIG. 8 graphically shows Applicants' algorithm to derive the original data of FIG. 7A using the retrieved first image of FIG. 7B and the retrieved second image of FIG. 7D.

Referring now to FIGS. 7A, 7D, 8, and 14, in certain embodiments, step 1495 comprises using the algorithm shown in FIG. 8 wherein the method uses a retrieved first image, such as retrieved first image 720, and a retrieved second image, such as retrieved second image 740. As shown in FIG. 8, Applicants' method forms a first term by adding the retrieved first image 720 to the retrieved second image 740 and subtracting an all 1's matrix 810. The method then forms a second term by dividing the first term by 2. The method then derives the original data without noise artifacts 710 by subtracting the second term from the retrieved original data with noise artifacts 720.

In certain embodiments, Applicants' method writes an all 1's matrix, such as matrix 810, to a third storage location in the holographic data storage medium, such as holographic data storage medium 195. In other embodiments, Applicants' matrix generates an all 1's matrix, such as matrix 810, when that matrix is needed to perform the algorithm set forth in FIG. 8.

In certain embodiments Applicants' method in step 1495 compares a retrieved first image to a retrieved second image, wherein that second image was formed in step 1440 by rotating the first image. Applicants' method then identifies the corrupted data points, and replaces the corrupted data points with original data points to derive the original data.

In certain embodiments Applicants' method in step 1495 compares a retrieved first image to a retrieved second image, wherein that second image comprises a complex conjugate of the first image. Applicants' method then identifies the corrupted data points, and replaces the corrupted data points with original data points to derive the original data in toto.

In certain embodiments, individual steps recited in FIG. 14 may be combined, eliminated, or reordered.

In certain embodiments, Applicants' invention includes instructions residing memory 663 (FIG. 6), where those instructions are executed by a processor, such as processor 664 (FIG. 6), to perform one or more of steps 1410, 1420, 1430, 1440, 1450, 1460, 1470, 1490, and/or 1495, recited in FIG. 14.

In other embodiments, Applicants' invention includes instructions residing in any other computer program product, where those instructions are executed by a computer external to, or internal to, system 600, to perform one or more of steps 1410, 1420, 1430, 1440, 1450, 1460, 1470, 1490, and/or 1495, recited in FIG. 14. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to store and retrieve information using holographic data storage media, comprising the steps of:
   providing original data;
   generating a first image of said original data;
   encoding said first image in a holographic data storage medium at a first storage location;
   generating a second image of said original data, wherein said second image differs from said first image; and encoding said second image in a holographic data storage medium at a second storage location;

wherein said generating a second image step further comprises generating a second image comprising the inverse of said first image.

2. The method of claim 1, wherein said encoding said first image step further comprises encoding said first image in a first holographic data storage medium, and wherein said encoding said second image step further comprises encoding said second image in a second holographic data storage medium, wherein said first holographic data storage medium differs from said second holographic data storage medium.

3. The method of claim 1, wherein said generating a second image step comprises generating a second image by rotating said first image.

4. The method of claim 1, wherein said generating a second image step comprises generating a second image by forming the complex conjugate of said first image.

5. The method of claim 1, further comprising the steps of:
generating a retrieved first image by illuminating with a reference beam said encoded holographic data storage medium at said first storage location;
decoding retrieved data from said retrieved first image;
determining if said retrieved data matches said original data;
operative if said retrieved data does not match said original data:
generating a retrieved second image by illuminating with said reference beam said encoded holographic data storage medium at said second storage location; and
deriving said original data using said retrieved first image and said retrieved second image.

6. A storage controller comprising a computer readable medium having computer readable program code disposed therein to store information in a holographic data storage medium, the computer readable program code comprising a series of computer readable program steps to effect:
receiving original data;
generating a first image of said original data;
encoding said first image in a holographic data storage medium at a first storage location;
generating a second image of said original data, wherein said second image differs from said first image; and
encoding said second image in said holographic data storage medium at a second storage location;
wherein said computer readable program code to generate a second image comprises a series of computer readable program steps to effect generating a second image comprising the inverse of said first image.

7. The storage controller of claim 6, wherein:
said computer readable program code to encode said first image further comprises a series of computer readable program steps to encode said first image in a first holographic data storage medium; and
said computer readable program code to encode said second image further comprises a series of computer readable program steps to encode said second image in a second holographic data storage medium, wherein said first holographic data storage medium differs from said second holographic data storage medium.

8. The storage controller of claim 6, wherein said computer readable program code to generate a second image comprises a series of computer readable program steps to effect generating a second image by rotating said first image.

9. The storage controller of claim 6, wherein said computer readable program code to generate a second image comprises a series of computer readable program steps to effect generating a second image by forming the complex conjugate of said first image.

10. The storage controller of claim 6, wherein said computer readable program code further comprises a series of computer readable program steps to effect:
generating a retrieved first image by illuminating with a reference beam said encoded holographic data storage medium at said first storage location;
decoding retrieved data from said retrieved first image;
determining if said retrieved data matches said original data;
operative if said retrieved data does not match said original data:
generating a retrieved second image by illuminating with said reference beam said encoded holographic data storage medium at said second storage location; and
deriving said original data using said retrieved first image and said retrieved second image.

11. A computer program product encoded in a non-transitory information storage medium wherein said computer program product is usable with a programmable computer processor to store information in a holographic data storage medium, comprising:
computer readable program code which causes said programmable computer processor to receive original data;
computer readable program code which causes said programmable computer processor to generate a first image of said original data;
computer readable program code which causes said programmable computer processor to encode said first image in a holographic data storage medium at a first storage location;
computer readable program code which causes said programmable computer processor to generate a second image of said original data, wherein said second image differs from said first image; and
computer readable program code which causes said programmable computer processor to encode said second image in said holographic data storage medium at a second storage location.
wherein said computer readable program code to generate a second image comprises computer readable program code which causes said programmable computer processer to generate a second image comprising the inverse of said first image.

12. The computer program product of claim 11, wherein:
said computer readable program code to encode said first image further comprises computer readable program code which causes said programmable computer processor to encode said first image in a first holographic data storage medium; and
said computer readable program code to encode said second image further comprises computer readable program code which causes said programmable computer processor to encode said second image in a second holographic data storage medium, wherein said first holographic data storage medium differs from said second holographic data storage medium.

13. The computer program product of claim 11, wherein said computer readable program code to generate a second image comprises computer readable program code which causes said programmable computer processor to generate a second image by rotating said first image.

14. The computer program product of claim 11, wherein said computer readable program code to generate a second image comprises computer readable program code which causes said programmable computer processor to generate a second image by forming the complex conjugate of said first image.

15. The computer program product of claim 11, further comprising:
- computer readable program code which causes said programmable computer processor to generate a retrieved first image by illuminating with a reference beam said encoded holographic data storage medium at said first storage location;
- computer readable program code which causes said programmable computer processor to decode retrieved data from said retrieved first image;
- computer readable program code which causes said programmable computer processor to determine if said retrieved data matches said original data;
- computer readable program code which, if said retrieved data does not match said original data causes said programmable computer processor to:
- generate a retrieved second image by illuminating with said reference beam said encoded holographic data storage medium at said second storage location; and
- derive said original data using said retrieved first image and said retrieved second image.

16. A method to provide data storage services by a data storage services provider to one or more data storage services customers, comprising the steps of:
- providing original data;
- generating a first image of said original data;
- encoding said first image in a holographic data storage medium at a first storage location;
- generating a second image of said original data, wherein said second image differs from said first image; and
- encoding said second image in a holographic data storage medium at a second storage location;
- generating a retrieved first image by illuminating with a reference beam said encoded holographic data storage medium at said first storage location;
- decoding retrieved data from said retrieved first image;
- determining if said retrieved data matches said original data;
- operative if said retrieved data does not match said original data:
- generating a retrieved second image by illuminating with said reference beam said encoded holographic data storage medium at said second storage location; and
- deriving said original data using said retrieved first image and said retrieved second image.

* * * * *